(12) United States Patent
Bettale et al.

(10) Patent No.: US 11,132,466 B2
(45) Date of Patent: Sep. 28, 2021

(54) METHOD FOR DETERMINING AN INTEGRITY SUM, ASSOCIATED COMPUTER PROGRAM AND ELECTRONIC ENTITY

(71) Applicant: IDEMIA France, Courbevoie (FR)

(72) Inventors: Luk Bettale, Courbevoie (FR); Nicolas Debande, Courbevoie (FR); Aurélien Greuet, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 309 days.

(21) Appl. No.: 16/193,311

(22) Filed: Nov. 16, 2018

(65) Prior Publication Data

US 2019/0197259 A1 Jun. 27, 2019

(30) Foreign Application Priority Data

Dec. 22, 2017 (FR) ...................................... 1762965

(51) Int. Cl.
*H04L 29/06* (2006.01)
*G06F 21/64* (2013.01)
*H04L 9/00* (2006.01)
*G06F 11/10* (2006.01)
*G06F 21/60* (2013.01)
(Continued)

(52) U.S. Cl.
CPC .......... *G06F 21/64* (2013.01); *G06F 11/1004* (2013.01); *G06F 21/602* (2013.01); *H03M 13/096* (2013.01); *H04L 9/002* (2013.01); *H04L 9/0637* (2013.01); *H04L 2209/046* (2013.01)

(58) Field of Classification Search
CPC ....... G06F 21/64; G06F 11/1004; H04L 9/002
See application file for complete search history.

(56) References Cited

U.S. PATENT DOCUMENTS

2015/0082435 A1* 3/2015 Roussellet .............. G06F 21/64
726/23
2017/0116437 A1* 4/2017 Gammel ................. H04L 9/003

FOREIGN PATENT DOCUMENTS

EP 2296307 A1 3/2011

OTHER PUBLICATIONS

Christophe et al.: "Passive and Active c=Combined Attacks on AES Combining Fault Attacks and Side Channel Analysis", Fault Diagnosis and tolerance in Cryptography (FDTC), 2010 Workshop on IEEE, Piscataway, NJ, USA, Aug. 21, 2010, pp. 10-19, XP031757066.
(Continued)

*Primary Examiner* — Wasika Nipa
(74) *Attorney, Agent, or Firm* — Nixon & Vanderhye

(57) ABSTRACT

A method for determining a first integrity sum including the following steps: determining a first masked item of data by application of an "exclusive OR" operation between a first item of data and a first data mask; —determining a second item of data by application to the first masked item of data of a first cryptographic function, the second item of data being masked by a second data mask; —determining a second integrity sum associated with the second item of data by application to the second item of data of a checksum function; and determining the first integrity sum by application of an "exclusive OR" operation between the second integrity sum and a third integrity sum associated with the second data mask. A computer program and an electronic entity are also described.

15 Claims, 2 Drawing Sheets

(51) Int. Cl.
*H03M 13/09* (2006.01)
*H04L 9/06* (2006.01)

(56) References Cited

OTHER PUBLICATIONS

FR Search Report, dated Jun. 25, 2018, from corresponding FR 1762965 application.

* cited by examiner

METHOD FOR DETERMINING AN INTEGRITY SUM, ASSOCIATED COMPUTER PROGRAM AND ELECTRONIC ENTITY

FIELD OF THE INVENTION

The present invention generally relates to the field of cryptography.

It relates more specifically to a method for determining an integrity sum, as well as an associated computer program and an associated electronic entity.

BACKGROUND OF THE INVENTION

Secure electronic entities must make it possible to ensure confidentiality of the data that they store. Such entities are, for example, designed to protect the confidentiality of some cryptographic keys (in particular, secret keys), used in particular in applications for decrypting electronic messages, electronic signatures or identification signatures.

These secure electronic entities are designed to make it almost impossible for any intrusion into the functioning thereof, but it is preferable to verify that stored data is uncorrupted, i.e. not altered, while ensuring the confidentiality thereof.

Conventionally, two methods can be proceeded with, when the integrity of encrypted stored data is sought to be verified.

The first solution uses an integrity sum associated with raw data (before encryption). Before being stored, this data is encrypted. Verifying the integrity of the stored (encrypted) data thus consists of decrypting the encrypted data, then calculating the associated integrity sum thereof. The latter integrity sum is compared with the integrity sum associated with the raw data. However, this solution involves the handling of clear data (after decryption). The confidentiality of the stored data is no longer necessarily ensured.

The second solution proposes to store, in the electronic entity, an integrity sum associated with the encrypted data. A test for verifying the integrity of the stored (encrypted) data thus consists of independently determining another integrity sum associated with the encrypted data, then of comparing this sum with the one stored in the electronic entity. This method has the advantage of being executed on encrypted data; stored data is therefore not handled clearly. However, as encrypted data is itself known, a hacker could replace this encrypted data with another set of data corresponding to the same integrity sum. The integrity verification would thus be validated falsely. A hacker would also have the possibility of replacing the integrity sum with a suitable value, as they could calculate it from a set of data being substituted for the encrypted data.

In addition, by construction, determining an integrity sum depends on the encrypted data, which itself depends on the used encryption key. Thus, when data stored on two different entities are encrypted from two different keys, the second solution is not suitable (since it would thus be necessary to handle and compare two different integrity sum values, and therefore make two different applications of the checksum function, in order to be able to verify the integrity of the data).

BRIEF SUMMARY OF THE INVENTION

The present invention proposes to improve the verification of the integrity of sensitive data without affecting the confidentiality of this data.

More specifically, according to the invention, a method for determining a first integrity sum is proposed, comprising the following steps:
  determining a first masked item of data by application of an "exclusive OR" operation between a first item of data and a first data mask;
  determining a second item of data by application, to the first masked item of data, of a first cryptographic function, the second item of data being masked by a second data mask;
  determining a second integrity sum associated with the second item of data by application, to said second item of data, of a checksum function; and
  determining the first integrity sum by application of an "exclusive OR" operation between the second integrity sum and a third integrity sum associated with the second data mask.

Thus, according to this method, in order to verify the integrity of the input data, the encrypted data is first masked. This is then masked data which is decrypted and from which an integrity sum is calculated. The decryption step therefore does not disclose the input data clearly and verifying the integrity of the data is therefore done by ensuring the confidentiality of the input data.

Other non-limiting and advantageous characteristics of the method for determining a first integrity sum according to the invention, taken individually or according to all the combinations that are technically possible, are as follows:
  the first cryptographic function combines the first masked item of data and a result obtained at the output of an encryption block, through an "exclusive OR" operation;
  the encryption block uses a cryptographic key;
  the first cryptographic function is of the Cipher Feedback or Output Feedback or CounTerR type;
  the first data mask is generated randomly;
  a step of determining the third integrity sum associated with the second data mask is also provided, by application of the checksum function to the second data mask;
  the first cryptographic function is a function that maintains data masks;
  the first data mask and the second data mask are equal;
  the step of determining at least one integrity sum from among the second integrity sum and the third integrity sum is carried out by application of the checksum function with an initialization vector set to 0;
  the checksum function is an affine transformation of data;
  the checksum function is of the parity byte or cyclic redundancy check type;
  the following steps are also provided:
    receiving the first item of data and a fourth integrity sum associated with a third item of data; and
    verifying integrity of the third item of data by comparing the first integrity sum and the fourth integrity sum; and
  the first item of data is obtained by application of a second cryptographic function to the third item of data, the second cryptographic function making it possible to carry out an inverse operation of at least one operation of the first cryptographic function.

The invention also proposes a computer program comprising instructions that can be executed by a processor and suitable for implementing a method for determining a first integrity sum when these instructions are executed by the processor.

The invention also proposes an electronic entity for determining a first integrity sum comprising:
- a module for determining a first masked item of data, by application of an "exclusive OR" operation between a first item of data and a first data mask;
- a module for determining a second item of data, by application to the first masked item of data of a first cryptographic function, the second item of data being masked by a second data mask;
- a module for determining a second integrity sum associated with the second item of data by application to said second item of data of a checksum function;
- a module for determining the first integrity sum, by application of an "exclusive OR" operation between the second integrity sum and a third integrity sum associated with the second data mask.

The electronic entity can also comprise:
- a memory storing the first item of data and a fourth integrity sum associated with a third item of data; and
- a module for verifying integrity of the third item of data by comparing the first integrity sum and the fourth integrity sum.

BRIEF DESCRIPTION OF THE DRAWINGS

The following description regarding the appended drawings, given as non-limiting examples, will make what the invention consists of well understood, and how it can be achieved.

In the appended drawings.

DETAILED DESCRIPTION OF EMBODIMENTS OF THE INVENTION

Figure 1:
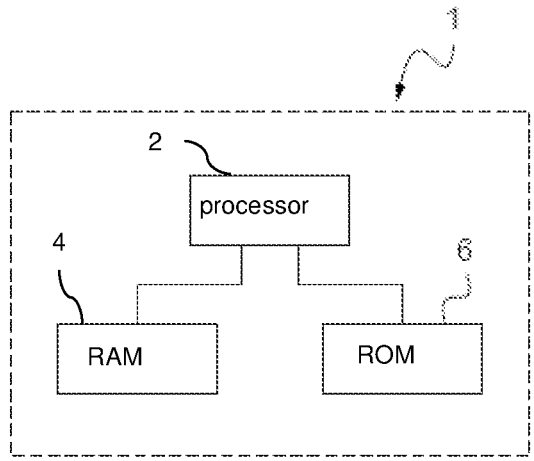
FIG. 1 schematically represents the main elements of an electronic entity within which the invention is implemented.

FIG. 1 schematically represents the main elements of an electronic entity 1 within which the invention is implemented. This electronic entity 1 is, for example, a microcircuit card, for example, a Universal Integrated Circuit Card (or UICC). In a variant, this could be a Secure Element (or SE)—for example, a secure microcontroller, a hand-held electronic device—for example, a communication terminal or an electronic passport, or a computer.

The electronic entity 1 comprises a processor 2 (here a microprocessor), a random-access memory 4 and a rewritable non-volatile memory 6 (for example, of the EEPROM type—Electrically Erasable and Programmable Read-Only Memory). The electronic entity 1 could possibly further comprise a read-only memory. The random-access memory 4 and the rewritable non-volatile memory 6 (as well as, if necessary, the read-only memory) are each connected to the processor 2 such that the processor 2 can read or write data in each of these memories.

One of these memories, for example the rewritable non-volatile memory 6, stores computer program instructions which make it possible for the implementation of at least one of the methods described below in reference to FIGS. 2 to 3, when these instructions are executed by the processor 2.

The memories 4, 6 also store data representing values used during the implementation of the methods described below. For example, the rewritable non-volatile memory 6 stores a cryptographic key K.

The random-access memory 4 moreover stores, for example within variables, data processed during the methods described below.

The electronic entity 1 also comprises a set of modules (not represented). These modules can, in practice, be produced by a combination of material elements and software elements. Each module has a functionality described in the methods that conform with the invention and outlined below. Thus, for each module, the electronic entity 1 stores, for example, software instructions that can be executed by the processor 2 of the electronic entity 1 in order to use a material element (for example, a communication interface or a memory) and thus implement the functionality offered by the module.

Figure 2:
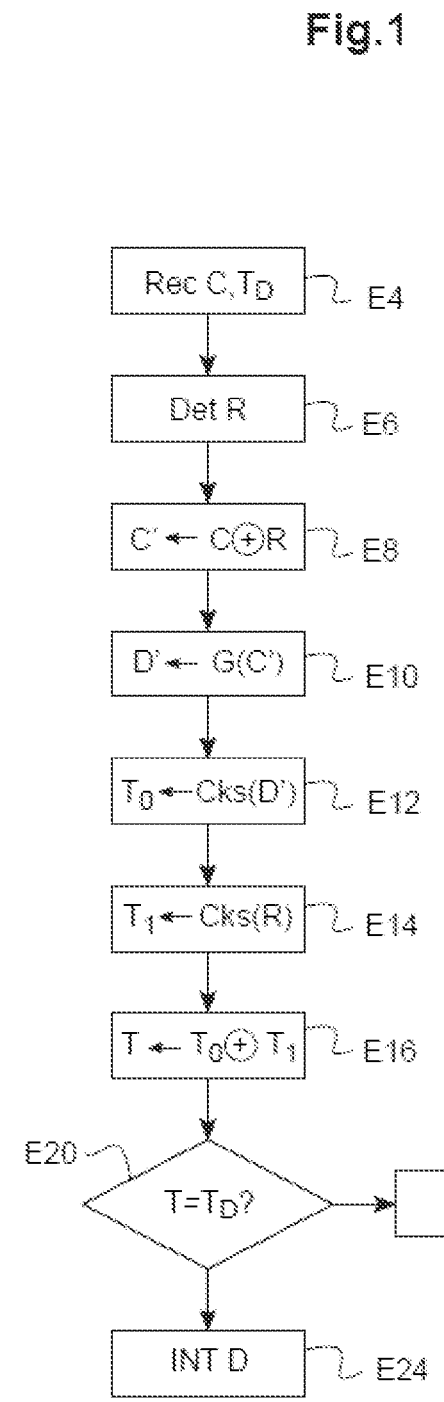
FIG. 2 represents, in the form of a flowchart, a first example of a method according to the invention.

FIG. 2 represents a first example of a method implemented in the electronic entity 1 according to the invention.

This method constitutes a method for cryptographically processing an item of input data D, of which the integrity is sought to be ensured, while maintaining the confidentiality thereof.

The case where an encrypted item of data C is obtained by encrypting the item of input data D, of which the confidentiality and integrity is sought to be ensured is now studied.

Specifically, the item of input data D has been encrypted beforehand by application of a cryptographic encryption function F, in order to obtain an encrypted item of data C.

The cryptographic encryption function F is, for example, of the Cipher Feedback (CFB), or Output Feedback (OFB), or CounTerR (CTR) type.

The encryption is for example done in a processor of an electronic entity, distinct from the electronic entity 1. In order to do this, in cases of block encryption mentioned above, the item of input data D can be split into P blocks of data $D_i$. Thus, P encryption blocks are successively applied, and for each encryption block, a variable X is used, having a bit length identical to that of the blocks of data $D_i$. For the first encryption block, the variable X is equal to an item of initialization data. This item of initialization data can be an initialization vector, an initialization vector previously encrypted or a value obtained by counter. For each following encryption block, the variable X is equal to a value obtained by counter, or to the result obtained as the output of the previous encryption block, possibly combined by an "exclusive OR" operation with an input data block.

The encryption of each block of data $D_i$ is based on the iteration i of the encryption block, of which the variable X is a parameter. This encryption block uses a cryptographic key stored for the application of a cryptographic algorithm $f_K$ to the variable X and results in obtaining the variable $f_K(X)$.

For each block of data $D_i$, an encrypted data block $C_i$ is then determined by application of an "exclusive OR" operation between the block of data $D_i$ and the variable $f_K(X)$ resulting from the iteration i of the encryption block: $C_i = D_i \oplus f_K(X)$. It is reminded that the logical "exclusive OR" (or XOR) operation corresponds to the symbol $\oplus$ between the variables considered. The encrypted item of data C is formed from all the P blocks of encrypted data $C_i$. The cryptographic encryption function F is, in this case, the combination of the successive applications of the cryptographic algorithm $f_K$ and of the "exclusive OR" operation. The cryptographic encryption function F is thus a linear transformation of data with respect to the "exclusive OR" operation.

Also, the case where an integrity sum $T_D$ associated with the item of input data D is obtained by application of a checksum function Cks to the item of input data D is studied.

This checksum function Cks is subsequently described in more detail in this description.

As represented in FIG. 2, the method starts at step E4 by receiving the encrypted item of data C by the electronic entity 1 (specifically by the processor 2) and an integrity sum $T_D$ associated with the item of input data D.

At step E6, the processor 2 randomly generates a data mask R.

This data mask R is then used at step E8 to mask the encrypted item of data C received at step E4. The masking step is carried out by application of an "exclusive OR" operation between the encrypted item of data C and the data mask R. A masked item of data C' is thus obtained from this step E8: $C'=C\oplus R$.

According to the first example of the method that conforms with the invention, a cryptographic decryption function G is then applied to the masked item of data C' at step E10. This cryptographic decryption function G makes it possible for the decryption of the masked item of data C'.

The cryptographic decryption function G, applied to the masked item of data C', makes it possible to decrypt the encrypted item of data C (by application of the inverse function $F^{-1}$ of the cryptographic encryption function F) while maintaining the mask R. In other words, the cryptographic decryption function G verifies: $G(C')=G(C\oplus R)=F^{-1}(C)\oplus R$.

For example, document EP2296307 can be referred to for more explanations about the handling of masks in relation to a cryptographic function.

The cryptographic decryption function G thus makes it possible, for example, for a Cipher Feedback (CFB), or Output Feedback (OFB) or CounTerR (CTR) type decryption.

At step E10, a decrypted item of data D' is thus obtained by application of the cryptographic decryption function G to the masked item of data C' (i.e. to the result obtained by application of an "exclusive OR" operation between the encrypted item of data C and the data mask R): $D'=G(C')=G(C\oplus R)$.

In a variant, the cryptographic encryption function F and the inverse function $F^{-1}$ (implemented within the cryptographic decryption function G) can be identical.

According to another variant, the cryptographic encryption function F, the inverse function $F^{-1}$ and the cryptographic decryption function G can be identical. This is, for example, the case for Output Feedback (OFB) or CounTerR (CTR) type encryption/decryption functions.

The use of the data mask R, generated randomly, makes it possible to ensure the confidentiality of the item of input data D during this decryption step, as the result of the application of the cryptographic decryption function G is also a random result: $D'=G(C\oplus R)=F^{-1}(C)\oplus R=D\oplus R$. This decryption step does not therefore disclose the item of input data D clearly.

Following the method according to the invention, at step E12, an integrity sum $T_0$ associated with the decrypted (masked) item of data D' is determined. In order to do this, the checksum function Cks is applied to the decrypted item of data D': $T_0=Cks(D')=Cks(D\oplus R)$.

The checksum function Cks is, for example, of the parity byte or Cyclic Redundancy Check (CRC) type.

This checksum function Cks is, in the cases mentioned above, an affine transformation of data. The checksum function Cks verifies therefore the linearity properties with respect to an "exclusive OR" operation.

For example, for a CRC type function, the linearity property is written, by considering two variables Y and Z: $CRC(Y\oplus Z)=CRC(Y)\oplus CRC(Z)$.

The checksum function Cks generally uses, at the input, an initialization vector IV. This initialization vector IV occurs by being combined by an "exclusive OR" operation to the item of data used as a parameter of the checksum function Cks.

For example, for a CRC type function, for which the initialization vector IV is a parameter of the checksum function, the following relation is verified: $CRC(IV, Y\oplus Z)=CRC(IV,Y)\oplus CRC(0,Z)$, with Y and Z as two variables.

According to this example, the integrity sum $T_0$ is written: $T_0=CRC(IV,D')=CRC(IV,D\oplus R)=CRC(IV,D)\oplus CRC(0,R)$.

In a variant, the initialization vector IV can, for example, be set to 0.

At the same time, at step E14, an integrity sum $T_1$ associated with the data mask R is determined. The integrity sum $T_1$ is obtained by application of the checksum function Cks to the data mask R: $T_1=Cks(R)$.

In the case of the example above, the integrity sum $T_1$ is written: $T_1=CRC(0,R)$.

The integrity sum $T_0$ associated with the decrypted item of data D' obtained at step E12 and the integrity sum $T_1$ associated with the data mask R obtained at step E14 are combined, at step E16, by application of an "exclusive OR" operation to determine the integrity sum T. The linearity property of the checksum function makes it possible to show that the integrity sum T is associated with the item of input data D: $T=T_0\oplus T_1=Cks(D')\oplus Cks(R)=Cks(D'\oplus R)=Cks(D\oplus R\oplus R)=Cks(D)$.

By considering the example presented above, the integrity sum T is written: $T=T_0\oplus T_1=CRC(IV,D')\oplus CRC(0,R)=CRC(IV,D'\oplus R)=CRC(IV,D\oplus R\oplus R)=CRC(IV,D)$.

The integrity sum T and the integrity sum $T_D$ are then used to verify the integrity of the item of input data D.

Step E20 thus corresponds to a step of verifying integrity of the item of input data D. In order to do this, the integrity sum T and the integrity sum $T_D$ are compared.

If the equality $T=T_D$ is verified at step E20, the processor 2 can conclude on the conservation of integrity of the item of input data D (at step E24). The processor 2 can, for example, then implement a succession of operations using the masked item of data D'. This succession of operations also takes into account the data mask R.

The succession of operations corresponds, for example, to a cryptographic algorithm of which the material implementation is done in an entity external to the electronic entity 1. For example, it can be done in a cryptoprocessor or a coprocessor. The cryptographic algorithm can, for example, be of the "advanced encryption standard" (AES) or "triple DES" (3DES) or "SEED" type, or also of "governmental standard" (GOST) type.

If the equality $T=T_D$ is not verified at step E20, the processor 2 implements an error processing step (step E22). Such an error processing step E22 comprises, for example, the script of an item of blocking data (or lock) in the rewritable non-volatile memory 6. The presence of an item of blocking data in the rewritable non-volatile memory 6 will prevent any later functioning of the electronic entity 1. In order to do this, the processor 2 consults, for example, the potential storing zone of the item of blocking data during the start-up of the functioning thereof and stops the functioning thereof in case of detecting the item of blocking data.

Figure 3:
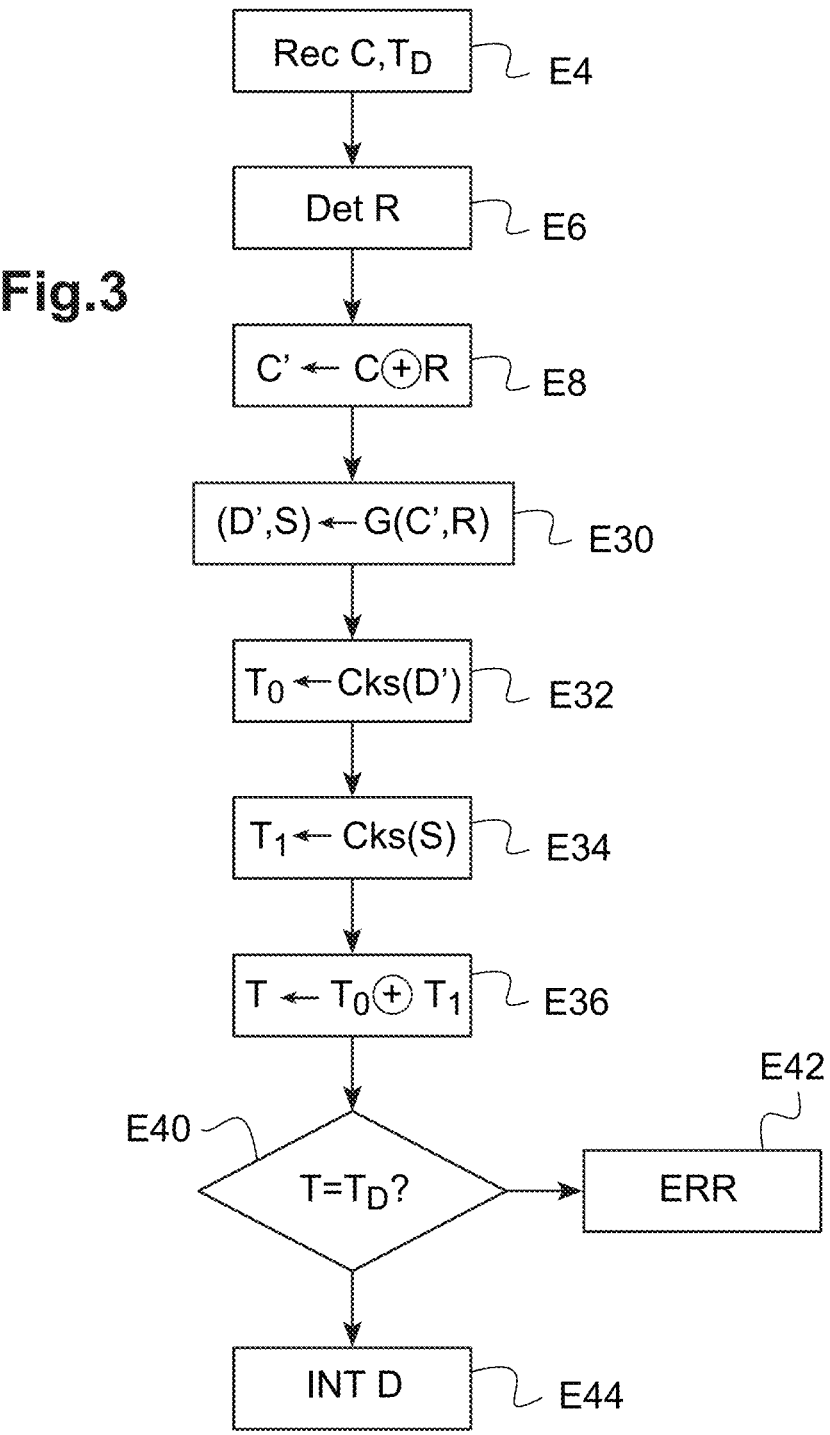
FIG. 3 represents, in the form of a flowchart, a second example of a method according to the invention.

FIG. 3 represents a second example of the method according to the invention. The steps shared by FIGS. 2 and 3 have the same references and will not subsequently be described again.

According to this second example of the method represented in FIG. 3, the cryptographic decryption function G, applied to the masked item of data C' at step E30, can be a function which makes it possible to decrypt the encrypted item of data C (by application of the inverse function $F^1$ of the cryptographic encryption function F), while masking the result obtained with another data mask. In other words, the decryption function G corresponds to a function which makes it possible to determine the inverse, while maintaining a masking of the data handled (with the application of a possibly different data mask).

In this case, the cryptographic decryption function G can be represented as a function of several variables, of which the data mask R is an input parameter. The cryptographic decryption function G thus verifies: $(D',S)=G(C',R)=G(C\oplus R,R)$, with $D'=F^{-1}(C)\oplus S$ and S corresponding to another data mask resulting from the application of the cryptographic function G.

Document EP2296307 can also be referred to, for example, for more explanations about the handling of masks in relation to a cryptographic function.

As represented in FIG. 3, at step E30, the data couple (D', S) is obtained, wherein the decrypted item of data D' is obtained by application of the cryptographic decryption function G to the masked item of data C' (i.e. to the result obtained by application of an "exclusive OR" operation between the encrypted item of data C and the data mask R): $(D',S)=G(C',R)=G(C\oplus R,R)$ with $D'=F^{-1}(C)\oplus S$. Therefore, as a result of the application of the cryptographic decryption function G, the decrypted item of data D' is obtained, but masked by the other data mask S (which is also stored at the output for the further steps of the method).

As described above, with the use of the data masks R, S, R being generated randomly, this makes it possible to ensure confidentiality of the item of input data D during this decryption step, as the result of the application of the cryptographic decryption function G is also a random result: $D'=F^{-1}(C)\oplus S=D\oplus S$. This decryption step does not therefore disclose the item of input data D clearly either.

In the further steps of the method according to the invention, as described above, at step E32, an integrity sum $T_0$ associated with the decrypted (masked) item of data D' is determined. In order to do this, the checksum function Cks is applied to the decrypted item of data D': $T_0=Cks(D')=Cks(D\oplus S)$.

In the case where the checksum function is of the cyclic redundancy check (CRC) type, and uses the initialization vector IV as a parameter, the integrity sum $T_0$ is written: $T_0=CRC(I\ V,D')=CRC(I\ V,D\oplus S)=CRC(I\ V,D)\oplus CRC(0,S)$.

At the same time, as represented in FIG. 3, at step E34, the integrity sum $T_1$ associated with the other data mask S (obtained at the output of the application of the cryptographic decryption function G) is written: $T_1=Cks(S)$.

In the case of the example mentioned above, the integrity sum $T_1$ is thus written: $T_1=CRC(0,S)$.

The integrity sum $T_0$ associated with the decrypted item of data D' obtained at step E32 and the integrity sum $T_1$ associated with the other data mask S obtained at step E34 are combined, at step E36, by application of an "exclusive OR" operation to determine the integrity sum T. The linearity property of the checksum function makes it possible to show that the integrity sum T is associated with the item of input data D: $T=T_0\oplus T_1=Cks(D')\oplus Cks(S)=Cks(D'\oplus S)=Cks(D\oplus S\oplus S)=Cks(D)$.

In the case of the example presented, the integrity sum T is written: $T=T_0\oplus T=CRC(I\ V,D')\oplus CRC(0,S)=CRC(I\ V,D'\oplus S)=CRC(I\ V,D\oplus S\oplus S)=CRC(I\ V,D)$.

The integrity verification steps E40 to E44 are similar to steps E20 to E24 described above.

In a variant of this second example of the method according to the invention, a first data mask $R_1$ and a second data mask $R_2$ can be used at step E8 (after having been generated beforehand, randomly during a step of type E6). In this case, the masked item of data C' is obtained by application of an "exclusive OR" operation between the encrypted item of data C, the first data mask $R_1$ and the second data mask $R_2$: $C'=C\oplus R_1\oplus R_2$.

The application of the cryptographic decryption function G to the masked item of data makes it possible to obtain at the output, a triplet of data $(D', S_1, S_2)$: $(D',S_1,S_2)=G(C\oplus R_1\oplus R_2)=G(C\oplus R_1\oplus R_2,R_1,R_2)$ wherein the decrypted item of data D' is expressed by $D'=F^{-1}(C)\oplus S_1\oplus S_2=D\oplus S_1\oplus S_2$ (as previously, the other data masks $S_1$ and $S_2$ generated at the output of the application of the cryptographic decryption function G are stored for the further steps of the method).

In this variant, at step E34, an integrity sum $T_5$ and an integrity sum $T_6$ can be respectively obtained by application of the checksum function to the data mask $S_1$ and to the data mask $S_2$. The integrity sum T is thus obtained by application of an "exclusive OR" operation between the integrity sum $T_0$ associated with the decrypted item of data D', the integrity sum $T_5$ associated with the first mask $S_1$ and the integrity sum $T_6$ associated with the second mask $S_2$:

$T=T_0\oplus T_5\oplus T_6=Cks(D')\oplus Cks(S_1)\oplus Cks(S_2)=Cks(D'\oplus S_1\oplus S_2)=Cks(D\oplus S_1\oplus S_2\oplus S_1\oplus S_2)=Cks(D)$.

In the case of a checksum function of the cyclic redundancy check (CRC) type, which uses the initialization vector IV as a parameter, the following is obtained:

$T=T_0\oplus T_5\oplus T_6=CRC(I\ V,D')\oplus CRC(0,S_1)\oplus CRC(0,S_2)=CRC(I\ V,D'\oplus S_1\oplus S_2)=CRC(I\ V,D\oplus S_1\oplus S_2\oplus S_1\oplus S_2)=CRC(I\ V, D)$.

The integrity verification steps E40 to E44 are similar to steps E20 to E24 described above.

The invention claimed is:

1. A method for determining a first integrity sum, the method comprising:
   determining a first masked item of data by applying an exclusive OR operation between a first item of data and a first data mask;
   determining a second item of data by applying a first cryptographic function to the first masked item of data, the second item of data being masked by a second data mask;
   determining a second integrity sum associated with the second item of data by applying a checksum function to said second item of data; and
   determining the first integrity sum by applying an exclusive OR operation between the second integrity sum and a third integrity sum associated with the second data mask.

2. The method for determining the first integrity sum according to claim 1, wherein the first cryptographic function combines, by an exclusive OR operation, the first masked item of data and a result obtained at the output of an encryption block.

3. The method for determining the first integrity sum according to claim 2, wherein the encryption block uses a cryptographic key.

4. The method for determining the first integrity sum according to claim 1, wherein the first cryptographic function is a Cipher Feedback, Output Feedback, or CounTerR type.

5. The method for determining the first integrity sum according to claim 1, wherein the first data mask is generated randomly.

6. The method for determining the first integrity sum according to claim 1, further comprising:
determining the third integrity sum associated with the second data mask by applying the checksum function to the second data mask.

7. The method for determining the first integrity sum according to claim 1, wherein the first cryptographic function is a function that maintains data masks, and
wherein the first data mask and the second data mask are equal.

8. The method for determining the first integrity sum according to claim 1, wherein determining at least one integrity sum from the second integrity sum and the third integrity sum is done by applying the checksum function with an initialization vector set to 0.

9. The method for determining the first integrity sum according to claim 1, wherein the checksum function is an affine transformation of data.

10. The method for determining the first integrity sum according to claim 1, wherein the checksum function is a parity byte or Cyclic Redundancy Check type.

11. The method for determining the first integrity sum according to claim 1, further comprising:
receiving the first item of data and a fourth integrity sum associated with a third item of data; and
verifying an integrity of the third item of data by comparing the first integrity sum and the fourth integrity sum.

12. The method for determining the first integrity sum according to claim 11, wherein the first item of data is obtained by applying a second cryptographic function to the third item of data, the second cryptographic function enabling carrying out an inverse operation of at least one operation of the first cryptographic function.

13. A computer program embodied in a non-transitory storage medium comprising instructions that can be executed by a processor and suitable to implement the method according to claim 1 when the instructions are executed by the processor.

14. An electronic entity configured to determine a first integrity sum, the electronic entity comprising:
at least one processor configured to:
determine a first masked item of data by applying an exclusive OR operation between a first item of data and a first data mask,
determine a second item of data by applying a first cryptographic function to the first masked item of data, the second item of data being masked by a second data mask,
determine a second integrity sum associated with the second item of data by applying a checksum function to said second item of data, and
determine the first integrity sum by applying an exclusive OR operation between the second integrity sum and a third integrity sum associated with the second data mask.

15. The electronic entity for determining the first integrity sum according to claim 14, further comprising:
a memory storing the first item of data and a fourth integrity sum associated with a third item of data,
wherein the at least one processor is further configured to verify an integrity of the third item of data by comparing the first integrity sum and the fourth integrity sum.

* * * * *